United States Patent [19]

Berdahl et al.

[11] Patent Number: 4,794,157

[45] Date of Patent: Dec. 27, 1988

[54] POLYETHERIMIDE COPOLYMERS, AND METHOD FOR MAKING

[75] Inventors: Donald R. Berdahl, Scotia; Susan A. Nye, Albany, both of N.Y.

[73] Assignee: General Electric Company, Schenectady, N.Y.

[21] Appl. No.: 29,914

[22] Filed: Mar. 25, 1987

[51] Int. Cl.$^4$ .................................................. C08G 63/06
[52] U.S. Cl. .................................... 528/208; 528/125; 528/128; 528/172; 528/179; 528/180; 528/181; 528/207
[58] Field of Search ............... 528/208, 207, 179, 125, 528/128, 172, 180, 181

[56] References Cited

U.S. PATENT DOCUMENTS

| | | |
|---|---|---|
| 3,983,093 | 9/1976 | Williams, III et al. . |
| 4,092,297 | 5/1978 | Williams, III . |
| 4,098,800 | 7/1987 | Banucci et al. ................ 528/353 |
| 4,197,396 | 4/1980 | Banucci et al. ................ 528/125 |
| 4,417,044 | 11/1983 | Pareth ............................ 528/179 |

Primary Examiner—Maurice J. Welsh
Assistant Examiner—M. L. Moore
Attorney, Agent, or Firm—William A. Teoli; James C. Davis, Jr.; James Magee, Jr.

[57] ABSTRACT

The intercondensation of aryldiamine and a mixture of oxydiphthalic anhydride and aromatic bis(ether anhydride), such as 2,2-bis[4-(3,4-dicarboxyphenoxy)-phenyl]-propane dianhydride, have been found to provide tough flexible transparent copolymer having $T_g$'s from about 217° C. to 300° C.

14 Claims, No Drawings

POLYETHERIMIDE COPOLYMERS, AND METHOD FOR MAKING

BACKGROUND OF THE INVENTION

As shown by Heath et al. U.S. Pat. No. 3,847,867, incorporated herein by reference and assigned to the same assignee as the present invention, polyetherimides are available which are valuable high performance injection moldable thermoplastic materials. Although commercially available polyetherimides have been found to have superior solvent resistance and a glass transition temperature ($T_g$) of about 217°, these injection moldable materials cannot be employed in a variety of applications requiring enhanced solvent resistance and heat distortion temperatures.

Efforts have been made to enhance the $T_g$ and the solvent resistance of polyetherimides resulting from the intercondensation of BPA dianhydride (BPADA) and aryldiamine, for example meta-phenylene diamine (MPD). One procedure, for example, is by using BPADA with another dianhydride, such as pyromellitic diahydride (PMDA) or thioether dianhydride (SDA) and thereafter intercondensing the dianhydride mixture, either jointly or separately with aryldiamine, as shown by Williams et al., U.S. Pat. No. 3,983,093, assigned to the same assignee as the present invention and incorporated herein by reference. As taught by Williams et al., polyetherimides resulting from the use of BPADA with other dianhydrides have improved solvent resistance and higher $T_g$'s, as compared to the polyetherimides resulting from the intercondensation of BPADA and aryldiamine. However, it has been found that polyetherimide films containing greater than about 20 mole percent of SDA based on the total moles of BPADA and SDA are often brittle and opaque. It has also been found that polyetherimides made from mixtures of BPADA and PMDA often contain unwanted block copolymer formation due to the differences in the reactivity of the respective dianhydrides during intercondensation. In addition, polyetherimide resulting from the intercondensation of mixtures of BPADA and PMDA also can be extremely rigid and become unprocessable in instances where the PMDA exceeds 20 mole percent of the dianhydride mixture based on the total moles of BPADA and PMDA.

The present invention is based on the discovery that polyetherimide copolymers resulting from the intercondensation of aryl diamine with mixtures of BPADA and oxydiphthalic anhydride, (ODAN), which hereinafter means 4,4'-oxybisphthalic anhydride, 3,4'-oxybisphthalic anhydride, 3,3'-oxybisphthalic anhydride, or mixtures thereof and preferably 4,4'-oxybisphthalic anhydride or a mixture of 4,4'-oxybisphthalic anhydride and up to 50 mole percent of 3,4'-oxybisphthalic based on total moles of 4,4' and 3,4', can result in the production of tough, flexible, solvent resistant transparent films having $T_g$'s in the range of from about 225° to 299° C.

STATEMENT OF THE INVENTION

There is provided by the present invention, polyetherimide copolymers comprising the intercondensation product of reaction of substantially equal molar amounts of (A) aromatic bisanhydride, and (B) aryldiamine, where (A) comprises from about 1 to 99 mole percent of oxydiphthalic anhydride and from about 99 to 1 mole percent of aromatic bis(ether anhydride) of the formula,

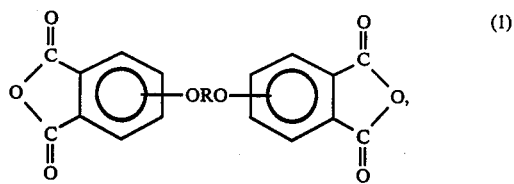

and (B) is selected from aryldiamine of the formula,

R is a member selected from the class consisting of divalent organic radicals of the formulas,

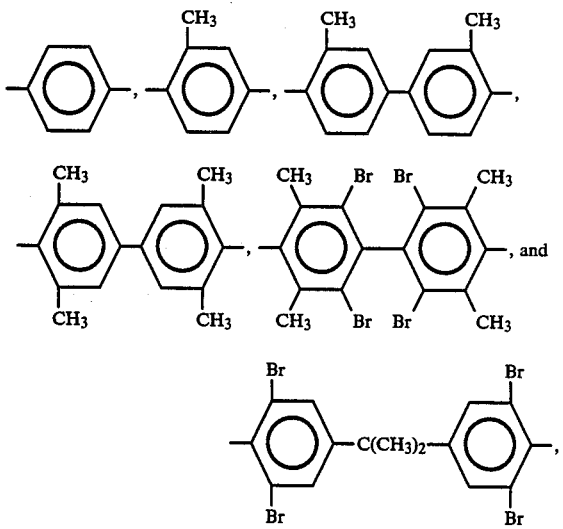

and divalent organic radicals included within the formula,

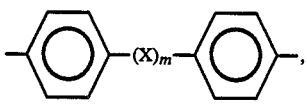

X is a member selected from the class consisting of divalent radicals of the formulas,

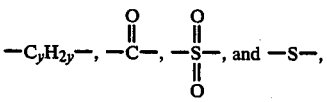

m is 0 or 1, y is a whole number from 1 to 5, and the bonds of the —O—R—O— radical of formula 1 are equally situated on the phthalic anhydride end groups in the 3,3'-positions, 3,4'-positions or the 4,4'-positions, and $R^1$ is a divalent organic radical having from 6–20 carbon atoms and halogenated derivatives thereof, alkylene radicals and cycloalkylene radicals having from 2–20 carbon atoms, $C_{(2-8)}$ alkylene terminated polydiorganosiloxane, and divalent radicals included within the formula,

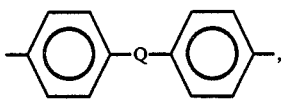

Q is a member selected from the class consisting of

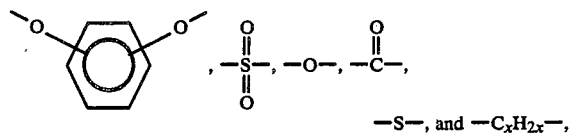

and x is a whole number from 1 to 5 inclusive. Preferably, the polyetherimide copolymers of the present invention in the form of polyetheramic acids have about 75–99 mole % ODAN and about 1%–25 mole % of BPADA which can be used to impregnate carbon fibers to make solvent resistant composites having $T_g$'s=260°–300° C. Polyether amic acid copolymers having 1–99 mole % ODAN can be converted to transparent films having $T_g$'s=225°–300° C. In instances where injection moldable polyetherimide copolymer pellets are desired, which can be reinforced with up to 50% by weight, filler intercondensation formulations can be used having up to 50 mole % of ODAN, based on total moles of ODAN and BPADA used in the intercondensation mixture.

There are included within the aromatic (ether anhydride) of formula (1) compounds, such as 2,2-bis[4-(2,3-dicarboxyphenoxy)phenyl]propane dianhydride, and 2,2-bis[4-(3,4-dicarboxyphenoxy)phenyl]propane dianhydride.

Aryl diamine of formula (2) means one or more aryl diamine can be intercondensed with aromatic bisanhydride to make the polyetherimide or polyether amic acid copolymers. Among the aryl diamine of formula (2) or mixtures thereof there are included, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isopropylbenzene;
m-xylylenediamine;
p-xylylenediamine;
2,4-diaminotoluene; and
2,6-diaminotoluene.

In another aspect of the present invention, there is provided several methods for making polyetherimide copolymers and injection moldable pellets. Other procedures are provided for making polyether amic acid copolymers and tough transparent flexible solvent resistant polyetherimide films having $T_g$'s in the range of from 225° C. to 299° C.

One procedure for making polyetherimide copolymers is by the "melt polymerization" of oxydiphthalic anhydride (ODAN) and aromatic bis(etheranhydride) of formula (1), referred to hereinafter as "BPADA" which can be effected either together or stepwise with aryldiamine under a nitrogen or an inert atmosphere with agitation to temperatures up to 350° C. A technique which can be used to make polyether amic acid copolymers convertible to tough polyetherimide films of the present invention is by "solution polymerization" in an inert organic solvent, such as o-dichlorobenzene, meta-cresol, and o-chlorophenol. The solution polymerization of a mixture or stepwise reaction of ODAN, BPADA, and aryldiamine and chain stopper can be effected by stirring the various ingredients in the organic solvent until dissolved to temperatures of about 200° C. Thereafter, the resulting solution can be agitated while azeotropically distilling the resulting water of reaction. The resulting polyetherimide acid can thereafter be precipitated from a solvent, such as methanol, followed by drying the resulting product at temperatures of up to 150° C. under reduced pressure. Transparent polyetherimide films can be made by compression molding resulting from precipitated product.

Solution polymerization which can be used to prepare the polyether amic acid copolymers of the present invention can be conducted by a "thin film or a thick film amic acid" procedure. The various ingredients, including ODAN, BPADA, aryldiamine, along with a chain stopper such as phthalic anhydride, can be stirred in a dipolar aprotic solvent, for example N,N-dimethylacetamide, N-n-methylpyrrolidone, and N,N-dimethylformamide. The resulting mixture can be agitated at ambient temperatures for 2 hours or more until the solution becomes homogeneous and viscous. The solution can then be applied onto a suitable substrate, such as a glass substrate, and drawn into films using a thin film applicator, such as from 0.5 to 10 mils. The resulting polyamic acid film can then be heated gradually in a programmable oven to a temperature in the range of from 300° C. to 350° C. using 25° increments per minute. After the films have become imidized, they can be readily removed from the substrate by placing the heated substrate in boiling water until the film separates. A similar technique can be used to initially form a thick amic acid film in a dipolar aprotic solvent in combination with a suitable chain stopper.

The polyetherimide compositions of the present invention can be used in a variety of applications such as high performance injection moldable thermoplastics having superior viscous heat distortion. These polyetherimides can be reinforced with standard fillers to form composites with glass fibers, graphite, carbon fibers, chopped glass, chopped carbon fibers, clay, silica, etc. There can be utilized per hundred parts by weight of polyetherimide from 1 to 200 parts of filler.

In order that those skilled in the art will be better able to practice the present invention, the following examples are given by way of illustration and not by way of limitation. All parts are by weight.

EXAMPLE 1

A mixture of 37.58 grams, 0.0722 mole of 2,2-bis[4-(3,4-dicarboxyphenoxy)phenyl]propane dianhydride (BPADA), 7.48 grams, 0.0241 mole of oxydiphthalic anhydride (ODAN) and 10.41 grams, 0.0963 mole of metaphenylenediamine (MPD) was charged to a stirring Helicone reactor at ambient temperatures under nitrogen. The mixture was heated to a temperature of 300° C. with stirring under nitrogen for 50 minutes. There was obtained a product at the bottom of the reactor which was extruded and collected. The product was a polyetherimide having an IV of 0.570 and a molecular weight (GPC using polystyrene standards) $M_w=97,100$, $M_n=29,200$, $M_w/M_n-3.3$; $T_g=231°$ C. The polyetherimide consisted essentially of equal amounts of metaphenylenediamine units intercondensed with dianhydride units consisting of about 25 mole percent of ODAN units and about 75 mole percent of BPADA units based on total moles of BPADA and ODAN units.

EXAMPLE 2

A mixture of 8.0085 grams (15.387 millimoles) of BPADA, 0.537 grams (1.730 millimole) of ODAN, 1.8710 gram (17.298 millimole) of MPD and 33 ml of reagent grade o-dichlorobenzene was stirred and gradually heated to 135° C. and maintained at this temperature for one hour. The resulting homogeneous solution was then refluxed for 1.5 hours during which time water of reaction was removed. The solution was refluxed an additional 1.5 hours, cooled to room temperature and diluted with chloroform and precipitated into methanol. A white precipitate was obtained which was collected by filtration and washed in methanol. The precipitate was then dried under a vacuum at 100° C. There was obtained 5.92 grams, or a 60 percent yield of a polyetherimide consisting essentially of equal molar amounts of chemically combined MPD units and dianhydride units consisting of about 10 mole percent of chemically combined ODAN units and 90 mole percent of chemically combined BPADA units. The product had an IV of 0.655; molecular weight (GPC); $M_w=100,800$, $M_n=32,500$, and $M_w/M_n=3.1$; $T_g=225°$ C. The polyetherimide was compression molded into a transparent flexible film at 300° C.

EXAMPLE 3

A mixture of 1.2403 grams (3.998 millimole) of ODAN, 0.3675 gram (0.706 millimole) of BPADA, 0.5191 gram (4.800 millimole) of MPD, 0.0284 gram (0.192 millimole) of phthalic anhydride, and 9 ml of freshly distilled dimethylacetamide was stirred at ambient temperature for 6 hours during which time the mixture became homogeneous and very viscous. A few drops of the material were placed respectively on several 2×3" glass plates and drawn into films using a 4 mil film applicator. The glass plates were then placed in a programmable oven and initially heated at 60° for one minute, and then at or by increments of 25° per minute up to 330° C., held at 330° C. for 70 minutes and then cooled to 30° C. over a 5 minute period. The resulting films were then removed from the glass plates by placing the plates in boiling water for a few minutes. There was obtained transparent amber colored films consisting essentially of chemically combined equal molar amounts of metaphenylene diamine units intercondensed with a mixture of dianhydride units consisting of about 85 mole percent of ODAN units and 15 mole percent of BPADA units and chain-terminated with phthalic anhydride units. The films had an average $T_g$ of about 269° C.

EXAMPLE 4

A mixture of 1.7737 grams (5.718 mmol) of ODAN, 2.9414 grams (5.651 mmol) of BPADA, 1.2366 grams (11.435 mmol) MPD, and 50 ml of freshly distilled dimethylacetamide was stirred at ambient temperature for 2.5 hours. A portion of the resulting thick amic acid solution was transferred to a glass plate heated to 100° C. on a hot plate. The material was heated a this temperature for 16 hours during which time the temperature of the mixture was raised by 50° C. per hour to 300° C. After 4 hours the material was cooled to room temperature and removed by stripping from the glass plate. There was obtained a tough transparent flexible film having a $T_g$ of 232° C.

EXAMPLE 5

A suspension of 2.7102 grams (8.737 millimoles) of ODAN, 1.5156 grams (2.912 millimoles) of BPADA, and 17 ml of HLPC grade methanol was heated to reflux and stirred for 4 hours. There was added to the resulting homogeneous mixture, 1.2598 grams (11.65 millimoles) of MPD, and the solvent was then evaporated on a rotoevaporator for one hour and then on under vacuum at 0.25 torr for about 12 hours. The mixture was then placed in a kugelrohr oven under a slow flow of nitrogen and was heated to 200° C. while being rotated over a one-hour period. Heating of the mixture was continued to 200° C. for 6 hours. There was obtained a polymer foam after the mixture had been heated for one hour at 100° C. The product could be compression molded at 300° C. into a film which was found to be translucent and somewhat brittle having a $T_g$ of 252° C. Based on method of preparation, the product was a polyetherimide having substantially equal molar amounts of MPD units chemically combined with organic dianhydride units consisting of 75 mole percent of ODAN units and 25 mole percent of BPADA units.

EXAMPLE 6

In accordance with the procedure of Example 3, the "thin film amic acid method", a series of polyetherimide films were prepared containing from 0-100 mole percent of ODAN and 100 mole percent to 0 mole percent of BPADA. Another series of polyetherimide films were prepared by the thin film amic acid method composed of from about 10 to 100 mole percent of bis(3,4-dicarboxyphenyl)sulfur dianhydride (SDA) and from 0 to 90 mole percent of BPADA. The aforementioned SDA and BPADA dianhydrides or mixtures thereof were intercondensed with substantially equal molar amounts of MPD. The following results were obtained:

TABLE I

| Mol % SDA or ODAN intercondensed with BPADA in polyetherimide | SDA Polyetherimide $T_g$ | ODAN Polyetherimide $T_g$ |
| --- | --- | --- |
| 0 | 217 | 217 |
| 10 | 221 | 224 |
| 20 | 226 | — |
| 25 | — | 231 |
| 35 | 232 | — |
| 50 | 240 | 246 |
| 75 | — | 262 |
| 85 | — | 269 |
| 100 | 266 | 300 |

The above results show the polyetherimides having chemically combined BPADA and ODAN units have superior $T_g$'s over polyetherimides having chemically combined PBADA and SDA units.

In addition, it was also found that polyetherimide films containing greater than 20 mole percent of SDA units were brittle and opaque, while tough flexible transparent films were obtained having up to 100 mole percent of ODAN polyetherimide. In addition, because of the problems associated with crystallinity or incompatibility, tough, flexible films having a glass transition temperature higher than 226° C. could not be prepared from polyetherimide copolymers having more than about 25 mole percent of SDA units based on the total moles of SDA and BPADA units.

It was further found that when copolymers of BPADA and pyromellitic dianhydride (PMDA) were prepared the copolymers containing more than 20 mole percent of PMDA units, based on the total moles of PMDA and BPADA, intercondensed with MPD, became unprocessible.

EXAMPLE 8

Additional polyetherimide copolymers were prepared utilizing the various procedures outlined in Examples 1–5 referred to as "helicone" (melt polymerization method), amic acid thick film as shown by Example 4, "amic acid thin film", as shown by Example 3, "solution" as shown by Example 2, and "solid state" as shown by Example 5. In addition to ODAN, BPADA and MPD, there was also utilized para-phenylenediamine (PPD), oxydianiline (ODA), and SDAN which is a sulfone phenylenedianiline having the formula,

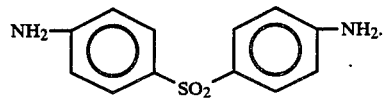

The following results were obtained.

TABLE II $T_g$ Data for ODAN/BPADA Polyimides[a]

| ODAN | BPADA | MPD | PPD | SDAN | ODA | Helicone | Amic Acid Thick Film | Amic Acid Thin Film | Solution | Solid State |
|---|---|---|---|---|---|---|---|---|---|---|
| 0 | 100 | 100 | — | — | — | 217 | — | — | — | 218[d] |
| 10 | 90 | 100 | — | — | — | 226[e] | — | — | 225[b,2] | — |
| 25 | 75 | 100 | — | — | — | 231[b] | — | — | — | — |
| 50 | 50 | 100 | — | — | — | 247[c] | 232[b] | 245[d] | 243[b,1] | — |
| 75 | 25 | 100 | — | — | — | N.O. | — | 262[d] | — | 252[d] |
| 85 | 15 | 100 | — | — | — | — | — | 269[d] | 276[b,3] | 265[b] ($T_m$460) 280[b,4] ($T_m$449) 270[d,5] ($T_m$438) |
| 100 | 0 | 100 | — | — | — | — | 300[d] | — | — | — |
| 50 | 50 | 75 | 25 | — | — | — | — | 248[d] | — | — |
| 50 | 50 | 50 | 50 | — | — | — | 251[b] | 251[d] | 254[d,1] | — |
| 50 | 50 | 25 | 75 | — | — | — | — | 253[d] | — | — |
| 50 | 50 | — | 100 | — | — | — | 254[d] | 260[d] | — | — |
| 100 | — | — | 100 | — | — | — | — | 335[d] | — | — |
| 50 | 50 | — | 75 | — | 25 | — | — | 249[d] | — | — |
| 50 | 50 | — | 50 | — | 50 | — | — | 245[d] | — | — |
| 50 | 50 | — | — | — | 100 | — | — | 236[d] | — | — |
| 100 | — | — | — | — | 100 | — | — | 264[d] | — | — |
| 100 | — | — | 50 | — | 50 | — | — | 307[d] | — | — |
| 100 | — | — | — | 50 | 50 | — | — | 295[d] | — | — |
| 100 | — | 50 | — | — | 50 | — | — | 300[d] | — | — |
| 50 | 50 | 25 | — | 75 | — | — | — | 271[d] | — | — |
| 50 | 50 | 50 | — | 50 | — | — | — | 266[d] | — | — |
| 50 | 50 | — | — | 100 | — | — | — | 280[d] | — | — |
| 100 | — | — | — | 100 | — | — | 303[d] | 315[d] | — | — |
| 50 | 50 | — | 50 | 50 | — | — | — | 274[d] | — | — |
| 50 | 50 | — | 75 | 25 | — | — | — | 267[d] | — | — |

[a]Composition is reported in mole % for dianhydrides and diamines individually
[b]No Chain Stopper
[c]1.3% Chain Stopper
[d]2% Chain Stopper (phthalic anhydride)
[e]2.5% Chain Stopper
[1]m-cresol
[2]o-dichlorobenzene
[3]sulfolane
[4]nitrobenzene
[5]diphenylsulfone

EXAMPLE 9

Utilizing the thin film amic acid procedure of Example 3, a series of polyetherimides were prepared from equal molar amounts of metaphenylenediamine and organic dianhydride consisting of a mixture of ODAN and BPADA. The resulting polyetherimides were evaluated for solvent resistance in a variety of solvents and the results are shown in Table III below where o-DCB is orthodichlorobenzene and "+" means the polyetherimide film was soluble, "—" means that the polyetherimide film was insoluble.

TABLE III

| | | Solubility of ODAN/BPADA/MPD Polyimides | | | | | |
|---|---|---|---|---|---|---|---|
| ODAN mole % | BPADA mole % | CH$_2$Cl$_2$ | CHCl$_3$ | m-xylene | o-DCB | m-cresol (cold) | m-cresol (hot) |
| 0 | 100 | + | + | — | + | + | + |

TABLE III-continued

| ODAN mole % | BPADA mole % | CH₂Cl₂ | CHCl₃ | m-xylene | o-DCB | m-cresol (cold) | m-cresol (hot) |
|---|---|---|---|---|---|---|---|
| 10 | 90 | + | + | − | swell | − | + |
| 25 | 75 | + | + | − | − | − | + |
| 50 | 50 | sl. swell | sl. swell | − | − | − | + |
| 85 | 15 | sl. swell | − | − | − | − | − |

The above results show that improved solvent resistance is achieved as the mole % of ODAN increases in the resulting polyetherimide.

Although the above examples are directed to only a few of the very many variables which can be used in the practice of the present invention and into the resulting polyetherimides made therefrom, it should be understood that the present invention is directed to a much broader variety of polyetherimides and method for making as shown in the description preceeding these examples.

What is claimed and sought to be protected by Letters Patent of the United States is as follows:

1. Injection moldable polyetherimide copolymers comprising the intercondensation product of reaction of substantially equimolar amounts of
   (A) aromatic bisanhydride comprising from about 10 to about 50 mole percent of oxydiphthalic anhydride and from about 90 to 50 mole percent of aromatic bis(etheranhydride) of the formula

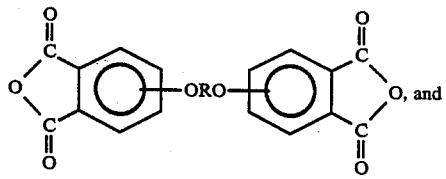

(B) aryldiamine of the formula,

where R is a member selected from the class consisting of divalent organic radicals of the formulas,

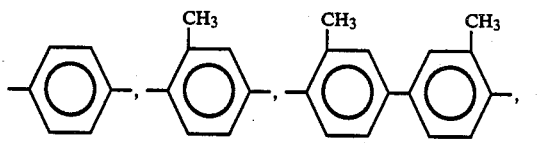

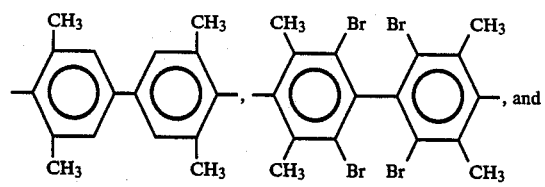

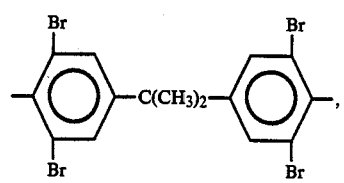

and (a) divalent organic radical of the formula,

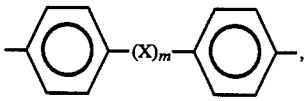

X is a member selected from the class consisting of divalent radicals of the formulas,

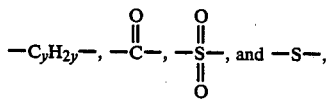

m is 0 or 1, y is a whole number from 1 to 5, and the divalent bonds of the —O—R—O— radical are equally situated on the phthalic anhydride end groups in the 3,3'-positions, 3,4'-or the 4,4'-positions, and R¹ is a divalent organic radical having from 6–20 carbon atoms and halogenated derivatives thereof, alkylene radicals and cycloalkylene radicals having from 2–20 carbon atoms, C₍₂₋₈₎ alkylene terminated polydiorganosiloxane, and divalent radicals included by the formula,

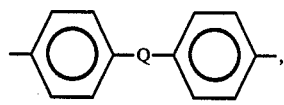

Q is a member selected from the class consisting of

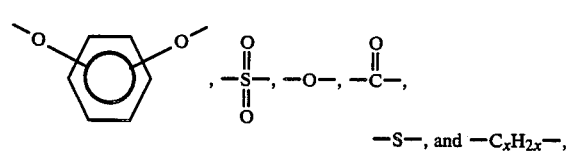

and x is a whole number from 1 to 5 inclusive.

2. Polyetherimide in accordance with claim 1, where the aromatic bis(ether anhydride) is 2,2-bis[4-(3,4-dicarboxyphenoxy)phenyl]propane dianhydride.

3. Polyetherimide in accordance with claim 1, where the aryldiamine is metaphenylene diamine.

4. Polyetherimide in accordance with claim 1, where the polyetherimide is chain stopped with phthalic anhydride.

5. Polyetherimide copolymers in accordance with claim 1, where the aromatic bisanhydride is intercondensed with an aryldiamine mixture.

6. Polyether amic acid copolymers in accordance with claim 1, resulting from the intercondensation of aromatic bisanhydride and a mixture of aryldiamines.

7. Composites of polyetherimide copolymers of claim 1.

8. Composites of polyether amic acid copolymers of claim 1.

9. Polyetherimide copolymer films in accordance with claim 1.

10. Polyetherimide copolymer pellets in accordance with claim 1, having up to 50 mole % of oxydiphthalic anhydride units based on total bisanhydride units.

11. Compression moldable polyetherimide copolymers comprising the intercondesation product of reaction of substantially equimolar amounts of
(A) aromatic bisanhydride comprising from about 50 to 75 mole percent of oxydiphthalic anhydride and from about 25 to 50 mole percent of aromatic bis(etheranhydride) of the formula

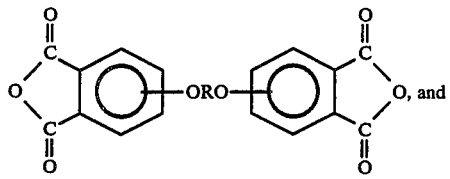

(B) aryldiamine of the formula, $NH_2R^1NH_2$, where R is a member selected from the class consisting of divalent organic radicals of the formulas,

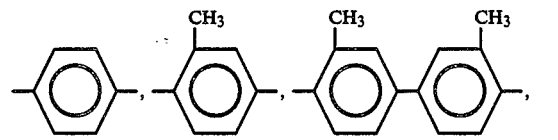

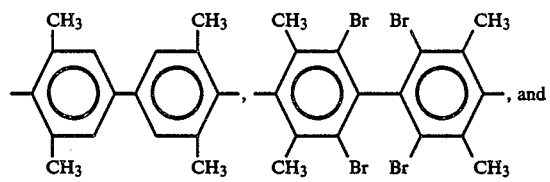

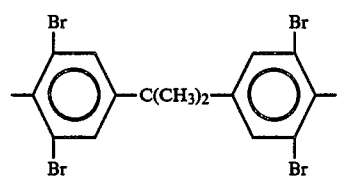

and (a) divalent organic radical of the formula,

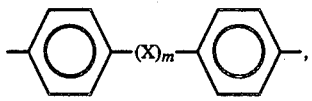

X is a member selected from the class consisting of divalent radicals of the formulas,

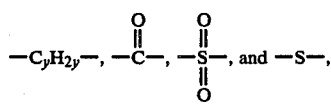

m is 0 or 1, y is a whole number from 1 to 5, and the divalent bonds of the —O—R—O— radical are equally situated on the phthalic anhydride end groups in the 3,3'-positions, 3,4'- or the 4,4'-positions, and $R^1$ is a divalent organic radical having from 6-20 carbon atoms and halogenated derivatives thereof, alkylene radicals and cycloalkylene radicals having from 2-20 carbon atoms, $C_{(2-8)}$ alkylene terminated polydiorganosiloxane, and divalent radicals included by the formula,

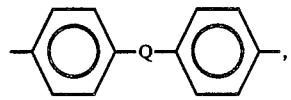

Q is a member selected from the class consisting of

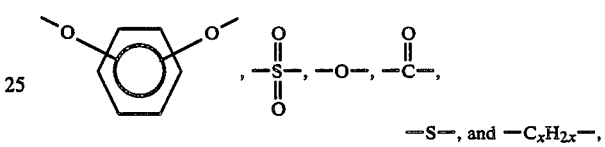

and x is a whole number from 1 to 5 inclusive.

12. Polyetheramic acid copolymers comprising the intercondensation product of reaction of substantially equimolar amounts of
(A) aromatic bisanhydride comprising from about 10 to about 85 mole percent oxydiphthalic anhydride and from about 15 to about 90 mole percent of aromatic bis(etheranhydride) of the formula

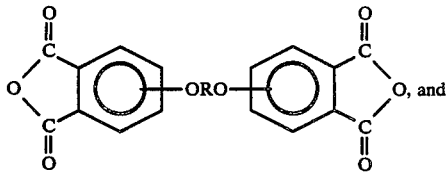

(B) aryldiamine of the formula, $NH_2R^1NH_2$, where R is a member selected from the class consisting of divalent organic radicals of the formulas,

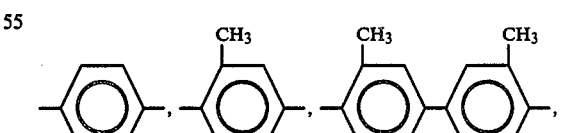

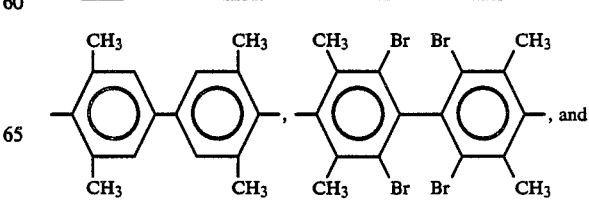

-continued

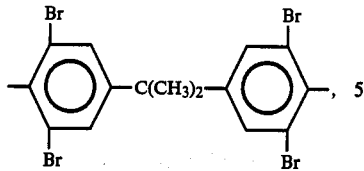

and (a) divalent organic radical of the formula,

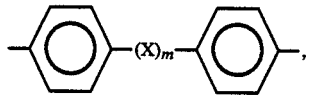

X is a member selected from the class consisting of divalent radicals of the formulas,

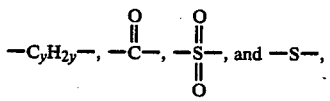

m is 0 or 1, y is a whole number from 1 to 5, and the divalent bonds of the —O—R—O— radical are equally situated on the phthalic anhydride end groups in the 3,3'-positions, 3,4'- or the 4,4'-positions, and $R^1$ is a divalent organic radical having from 6–20 carbon atoms and halogenated derivatives thereof, alkylene radicals and cycloalkylene radicals having from 2–20 carbon atoms, $C_{(2-8)}$ alkylene terminated polydiorganosiloxane, and divalent radicals included by the formula,

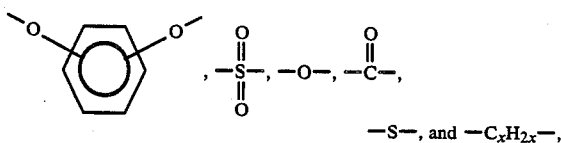

Q is a member selected from the class consisting of

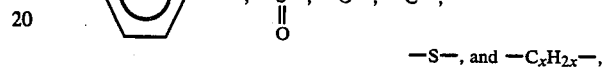

and x is a whole number from 1 to 5 inclusive.

13. Films formed by imidizing the polyetheramic acid of claim 12.

14. A carbon fiber composite made from the polyetheramic acid copolymer of claim 12.

* * * * *